United States Patent
Ok et al.

(10) Patent No.: US 11,419,188 B2
(45) Date of Patent: Aug. 16, 2022

(54) INDUCTION HEATING AND WIRELESS POWER TRANSMITTING APPARATUS HAVING IMPROVED CIRCUIT STRUCTURE

(71) Applicant: LG Electronics Inc., Seoul (KR)

(72) Inventors: Seungbok Ok, Seoul (KR); Dooyong Oh, Seoul (KR); Hyunwook Moon, Seoul (KR); Byeong Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 16/643,474

(22) PCT Filed: Aug. 13, 2018

(86) PCT No.: PCT/KR2018/009294
§ 371 (c)(1),
(2) Date: Feb. 28, 2020

(87) PCT Pub. No.: WO2019/045323
PCT Pub. Date: Mar. 7, 2019

(65) Prior Publication Data
US 2020/0367323 A1 Nov. 19, 2020

(30) Foreign Application Priority Data
Aug. 31, 2017 (KR) .................. 10-2017-0111469
Dec. 15, 2017 (KR) .................. 10-2017-0173675

(51) Int. Cl.
*H05B 6/06* (2006.01)
*H02J 50/12* (2016.01)
(Continued)

(52) U.S. Cl.
CPC ............. *H05B 6/065* (2013.01); *H02J 50/12* (2016.02); *H05B 6/1236* (2013.01);
(Continued)

(58) Field of Classification Search
CPC .... H05B 6/065; H05B 6/1236; H05B 6/1272; H05B 2213/03; H05B 2213/05;
(Continued)

(56) References Cited

U.S. PATENT DOCUMENTS 6,693,262 B2    2/2004  Gerola et al.
9,363,853 B2 *  6/2016  Gharagozloo ........... H05B 6/68
(Continued)

FOREIGN PATENT DOCUMENTS

EP      2428733      3/2012
JP      2016042431   3/2016
(Continued)

OTHER PUBLICATIONS

EP Extended European Search Report in European Appln. No. 18849568.3, dated Apr. 12, 2021, 5 pages.

*Primary Examiner* — Jared Fureman
*Assistant Examiner* — Michael J Warmflash
(74) *Attorney, Agent, or Firm* — Fish & Richardson P.C.

(57) ABSTRACT

An induction heating and wireless power transmitting apparatus includes a first group of working coils including a first working coil and a second working coil connected to each other in parallel, a first inverter that supplies resonant currents to at least one of the first working coil or the second working coil by performing a switching operation, a first semiconductor switch connected to the first working coil configured to turn on and turn off the first working coil, a second semiconductor switch connected to the second working coil and configured to turn on and turn off the second working coil, an auxiliary power supply configured to supply power to the first semiconductor switch and the second semiconductor switch, and a controller that controls the first inverter, the first semiconductor switch, and the second semiconductor switches.

20 Claims, 9 Drawing Sheets

(51) Int. Cl.
*H05B 6/12* (2006.01)
*H02M 3/158* (2006.01)
*H02M 7/06* (2006.01)

(52) U.S. Cl.
CPC ........... *H05B 6/1272* (2013.01); *H02M 3/158* (2013.01); *H02M 7/06* (2013.01); *H05B 2213/03* (2013.01); *H05B 2213/05* (2013.01)

(58) Field of Classification Search
CPC .. H05B 6/062; H05B 6/04; H05B 6/36; H02J 50/12; H02J 50/402; H02J 50/40; H02M 3/158; H02M 7/06; Y02B 40/00
See application file for complete search history.

(56) References Cited

U.S. PATENT DOCUMENTS

| | | | | |
|---|---|---|---|---|
| 2012/0152935 | A1* | 6/2012 | Kitaizumi | H05B 6/065 219/661 |
| 2013/0334211 | A1* | 12/2013 | Hayashinaka | H05B 6/065 219/662 |
| 2013/0334212 | A1* | 12/2013 | Sawada | H05B 6/065 219/662 |
| 2016/0323937 | A1* | 11/2016 | Anton Falcon | H05B 6/04 |
| 2019/0104569 | A1* | 4/2019 | Moon | H05B 6/062 |
| 2019/0124726 | A1* | 4/2019 | Moon | H05B 6/1272 |
| 2019/0124727 | A1* | 4/2019 | Moon | H02J 50/90 |
| 2021/0127459 | A1* | 4/2021 | Ok | H05B 6/06 |

FOREIGN PATENT DOCUMENTS

| | | |
|---|---|---|
| JP | 2016158332 | 9/2016 |
| JP | WO2014064932 | 9/2016 |
| KR | 20110009544 | 1/2011 |
| KR | 20110092071 | 8/2011 |
| KR | 20150132160 | 11/2015 |
| KR | 101727744 | 4/2017 |
| WO | WO2015092704 | 6/2015 |

* cited by examiner

INDUCTION HEATING AND WIRELESS POWER TRANSMITTING APPARATUS HAVING IMPROVED CIRCUIT STRUCTURE

CROSS-REFERENCE TO RELATED APPLICATIONS

This application is a National Stage application under 35 U.S.C. § 371 of International Application No. PCT/KR2018/009294, filed on Aug. 13, 2018, which claims the benefit of Korean Patent Application No. 10-2017-0111469, filed on Aug. 31, 2017 and Korean Patent Application No. 10-2017-0173675, filed on Dec. 15, 2017. The disclosures of the prior applications are incorporated by reference in their entirety.

TECHNICAL FIELD

The present disclosure relates to an induction heating and wireless power transmitting apparatus having an improved circuit structure.

BACKGROUND

Various types of cooking apparatuses may be used to heat food at homes and restaurants. For example, the cooking apparatuses may include gas stoves that are fueled by gas. In some cases, the cooking apparatuses may use electricity instead of gas to heat an object such as a cooking container including a pot.

Methods for heating an object subject to heating using electricity may be classified as a resistance heating method and an induction heating method. In the electrical resistive method, heat may be generated based on current flowing through a metal resistance wire or a non-metallic object, such as silicon carbide and may be transmitted to the object through radiation or conduction, to heat the object. The induction heating method is a method by which an object subject to heating (e.g., a cooking container) itself is heated by eddy currents that are generated in the object subject made of metallic ingredients, using a magnetic field that is generated around a coil when predetermined-magnitude of high-frequency power is supplied to the coil.

In recent years, technologies for wirelessly supplying power have been developed and have been used for various types of electronic devices. For example, a battery of an electronic device, to which the wireless power transmitting technology is applied, can be charged by being placed on a charge pad without connecting to an additional charge connector. In some cases, the electronic device, to which the wireless power transmitting technology is applied, may not include a wired cord or a wired charger, thereby ensuring improved mobility and a reduced size and weight.

The wireless power transmitting technology can be classified as an electromagnetic induction technology using a coil, a resonance technology using resonance, a radio emission technology for converting electric energy into microwaves and delivering the microwaves, and the like. For example, the electromagnetic induction method may use electromagnetic induction between a primary coil provided in a wireless power transmitting apparatus and a secondary coil provided in a wireless power receiving apparatus to transmit the power.

The above-described induction heating technology of an induction heating apparatus may be similar to the wireless power transmitting technology using electromagnetic induction, in that an object subject to heating is heated through electromagnetic induction.

For example, the induction heating and wireless power transmitting apparatus may include a working coil respectively at a corresponding area to heat each of the plurality of objects (e.g., a cooking container) or to transmit power wirelessly to each of the plurality of objects (e.g., a wireless power receiving apparatus).

In some cases, an induction heating and wireless power transmitting apparatus (i.e., a zone-free induction heating and wireless power transmitting apparatus) may include a plurality of working coils simultaneously heat a single object or in which power is simultaneously transmitted wirelessly to a single object through a plurality of working coils.

The zone-free induction heating and wireless power transmitting apparatus can inductively heat an object or can wirelessly transmit power to an object within an area in which a plurality of working coils are provided regardless of a size and position of the object.

FIG. 1 is a block diagram illustrating a zone-free induction heating apparatus in related art.

Referring to FIG. 1, a zone-free type induction heating apparatus 10a in the related art includes a plurality of working coils 26a and 28a. The plurality of working coils 26a and 28a are electrically connected to switches 40a and 42a (e.g., three-terminal switches), respectively, to switch circuits for operation of detecting an object. In some cases, a noise may be generated during the switching operation of each of the further switches 40a and 42a due to the above structure.

In some cases, when the object is disposed above the different working coils 26a and 28a, a switch 30a and a second switch 32a may be switched to be connected to a first inverter 18a and a second inverter 20a, respectively, to control synchronization of each of the working coils 26a and 28a. Even in this situation, a noise can be produced due to the switchover operation of the group relays.

In some cases, the volume of a circuit may increase where the switches 30a and 32a, the switches 40a and 42a, and an object detection circuit provided to detect an object occupy a significantly large portion of the circuit.

SUMMARY

The present disclosure describes an induction heating and wireless power transmitting apparatus that may turn on or off at high speed by independently separating a plurality of working coils through a semiconductor switch.

The present disclosure also describes an induction heating and wireless power transmitting apparatus may solve the noise problem occurring during the switching operation of the relay by performing the operation of detecting an object through the semiconductor switch without a relay.

The present disclosure further describes an induction heating and wireless power transmitting apparatus in which a relay and an object detection circuit are removed, thereby reducing volume of a circuit.

Objectives of the present disclosure are not limited to the above-described ones. Additionally, other objectives and advantages that have not been mentioned may be understood from the following description and may be more clearly understood from implementations. Further, it will be understood that the objectives and advantages of the present disclosure may be realized via means and combinations thereof that are described in the appended claims.

According to one aspect of the subject matter described in this application, an apparatus for induction heating and wireless power transmission includes a first group of working coils comprising a first working coil and a second working coil that are electrically connected to each other in parallel, a first inverter configured to perform a first switching operation to generate a first resonant current in at least one of the first working coil or the second working coil, a first semiconductor switch that is connected to the first working coil and that is configured to turn on and turn off the first working coil, a second semiconductor switch that is connected to the second working coil and that is configured to turn on and turn off the second working coil, an auxiliary power supply configured to supply power to the first semiconductor switch and the second semiconductor switch, and a controller configured to control the first inverter, the first semiconductor switch, and the second semiconductor switch.

Implementations according to this aspect may include one or more of the following features. For example, the apparatus may further include a rectifier configured to convert alternating current (AC) power supplied from a power supply to direct current (DC) power and to supply the DC power to the first inverter, where the first inverter is configured to convert the DC power supplied from the rectifier into the first resonant current; and a DC link capacitor that is electrically connected in parallel to the rectifier, where the DC link capacitor may have a first end configured to receive a DC voltage corresponding to the DC power and a second end connected to ground.

In some implementations, the first semiconductor switch may have a first end connected to the first working coil and a second end connected to the second end of the DC link capacitor, and the second semiconductor switch may have a first end connected to the second working coil and a second end connected to the second end of the DC link capacitor. In other implementations, the first semiconductor switch may have a first end connected to the first working coil and a second end connected to the first end of the DC link capacitor, and the second semiconductor switch may have a first end connected to the second working coil and a second end connected to the first end of the DC link capacitor.

In some implementations, the apparatus may further include: a second group of working coils comprising a third working coil and a fourth working coil that are electrically connected to each other in parallel; a second inverter that is electrically connected in parallel to the first inverter and that is configured to perform a second switching operation to generate a second resonant current in at least one of the third working coil or the fourth working coil; a third semiconductor switch that is connected to the third working coil and that is configured to turn on and turn off the third working coil; a fourth semiconductor switch that is connected to the fourth working coil and that is configured to turn on and turn off the fourth working coil; a rectifier that is configured to convert alternating current (AC) power supplied from a power supply to direct current (DC) power and to supply the DC power to at least one of the first inverter or the second inverter; and a DC link capacitor that is electrically connected in parallel to the rectifier, the DC link capacitor having a first end configured to receive a DC voltage corresponding to the DC power and a second end connected to ground.

In some examples, the auxiliary power supply may be configured to supply power to the third semiconductor switch and the fourth semiconductor switch, and the controller may be configured to control the second inverter, the third semiconductor switch, and the fourth semiconductor switch. In some examples, the first semiconductor switch may have a first end connected to the first working coil and a second end connected to the second end of the DC link capacitor, the second semiconductor switch may have a first end connected to the second working coil and a second end connected to the second end of the DC link capacitor, the third semiconductor switch may have a first end connected to the third working coil and a second end connected to the second end of the DC link capacitor, and the fourth semiconductor switch may have a first end connected to the fourth working coil and a second end connected to the second end of the DC link capacitor.

In some implementations, the first semiconductor switch may have a first end connected to the first working coil and a second end connected to the first end of the DC link capacitor, the second semiconductor switch may have a first end connected to the second working coil and a second end connected to the first end of the DC link capacitor, wherein the third semiconductor switch may have a first end connected to the third working coil and a second end connected to the first end of the DC link capacitor, and wherein the fourth semiconductor switch may have a first end connected to the fourth working coil and a second end connected to the first end of the DC link capacitor.

In some examples, the auxiliary power supply may include one output terminal that is configured to supply power to the first semiconductor switch, the second semiconductor switch, the third semiconductor switch, and the fourth semiconductor switch.

In some implementations, the first semiconductor switch may have a first end connected to the first working coil, the second semiconductor switch may have a first end connected to the second working coil, the third semiconductor switch may have a first end connected to the third working coil, and the fourth semiconductor switch may have a first end connected to the fourth working coil. The first end of the DC link capacitor may be connected to second ends of a first group of semiconductor switches among the first semiconductor switch, the second semiconductor switch, the third semiconductor switch, and the fourth semiconductor switch. The second end of the DC link capacitor may be connected to second ends of a second group of semiconductor switches among the first semiconductor switch, the second semiconductor switch, the third semiconductor switch, and the fourth semiconductor switch.

In some implementations, the auxiliary power supply may be configured to supply power to the first group of semiconductor switches and the second group of semiconductor switches. In some implementations, the controller may be configured to: detect a resonance current in at least one of the first working coil, the second working coil, the third working coil, or the fourth working coil, and based on a value of the detected resonance current, determine whether an object is placed above any one working coil among the first working coil, the second working coil, the third working coil, and the fourth working coil.

In some examples, the auxiliary power supply may include one output terminal that is configured to supply power to all of the first semiconductor switch, the second semiconductor switch, the third semiconductor switch, and the fourth semiconductor switch.

In some examples, each of the first semiconductor switch and the second semiconductor switch may include at least one of a metal oxide semiconductor field effect transistor (MOSFET) or an insulated gate bipolar mode transistor (IGBT).

In some implementations, the controller may be configured to: provide a plurality of pulses to the first inverter; apply a first portion of the plurality of pulses to the first semiconductor switch; detect a first resonance current generated in the first working coil in response to the first portion of the plurality of pulses applied to the first semiconductor switch; and based on a first value of the detected first resonance current, determine whether an object is placed above the first working coil.

In some implementations, the controller may be configured to apply, to the first inverter, a first voltage corresponding to each of the plurality of pulses and a second voltage corresponding to each of time intervals between the plurality of pulses, the second voltage being less than the first voltage. In some examples, the controller may be configured to, based on a predetermined period, alternately apply the plurality of pulses to the first semiconductor switch and the second semiconductor switch.

In some implementations, the controller may be configured to: apply a second portion of the plurality of pulses to the second semiconductor switch; detect a second resonance current generated in the second working coil in response to the second portion of the plurality of pulses applied to the second semiconductor switch; and based on a second value of the detected second resonance current, determine whether at least a portion the object is placed above the second working coil.

In some implementations, the controller may be configured to, based on the first value being less than a reference value, determine that at least a portion of the object is placed above the first working coil.

In some implementations, the auxiliary power supply may include one ground terminal that is connected to all of the first semiconductor switch, the second semiconductor switch, the third semiconductor switch, and the fourth semiconductor switch.

In some implementations, the induction heating and wireless power transmitting apparatus may include a first working coil portion that includes first and second working coils connected in parallel, and a first and second semiconductor switches connected to turn on or off the first and second working coils respectively, thereby turning on or off at high speed by independently separating the first and second working coils.

In some implementations, the induction heating and wireless power transmitting apparatus may include a first and second semiconductor switches connected to turn on or off the first and second working coils respectively, and a controller for controlling the operation of the first and second semiconductor switch respectively, thereby performing the operation of detecting an object without a relay and solving the noise problem occurring during the switching operation of the relay.

In some implementations, the induction heating and wireless power transmitting apparatus reduces the volume of a circuit by performing the operation of detecting an object using the semiconductor switch and the controller instead of the relay and the object detection circuit.

In some implementations, the induction heating and wireless power transmitting apparatus may improve a speed of the object detection by turning on or off at a high speed by separating a plurality of working coils independently through a semiconductor switch, thereby improving user satisfaction.

In some implementations, the induction heating and wireless power transmitting apparatus performs operation of detecting an object through the semiconductor switches without a relay, thereby reducing noise generated at the time of the switchover operation of a relay and satisfying the needs of users. The induction heating and wireless power transmitting apparatus may be used even during a time period for which people are sensitive to noise (e.g., at dawn or late at night), thereby ensuring improved usability.

In some implementations, the induction heating and wireless power transmitting apparatus may reduce volume of the circuit by not including the relay and the object detection circuit, thereby reducing the overall volume of the induction heating and wireless power transmitting apparatus. Furthermore, space utilization may be improved by reducing the overall volume of the induction heating and wireless power transfer apparatus.

Detailed effects of the present disclosure are described together with the above-described effects in the detailed description of the disclosure.

DETAILED DESCRIPTION

Figure 1:
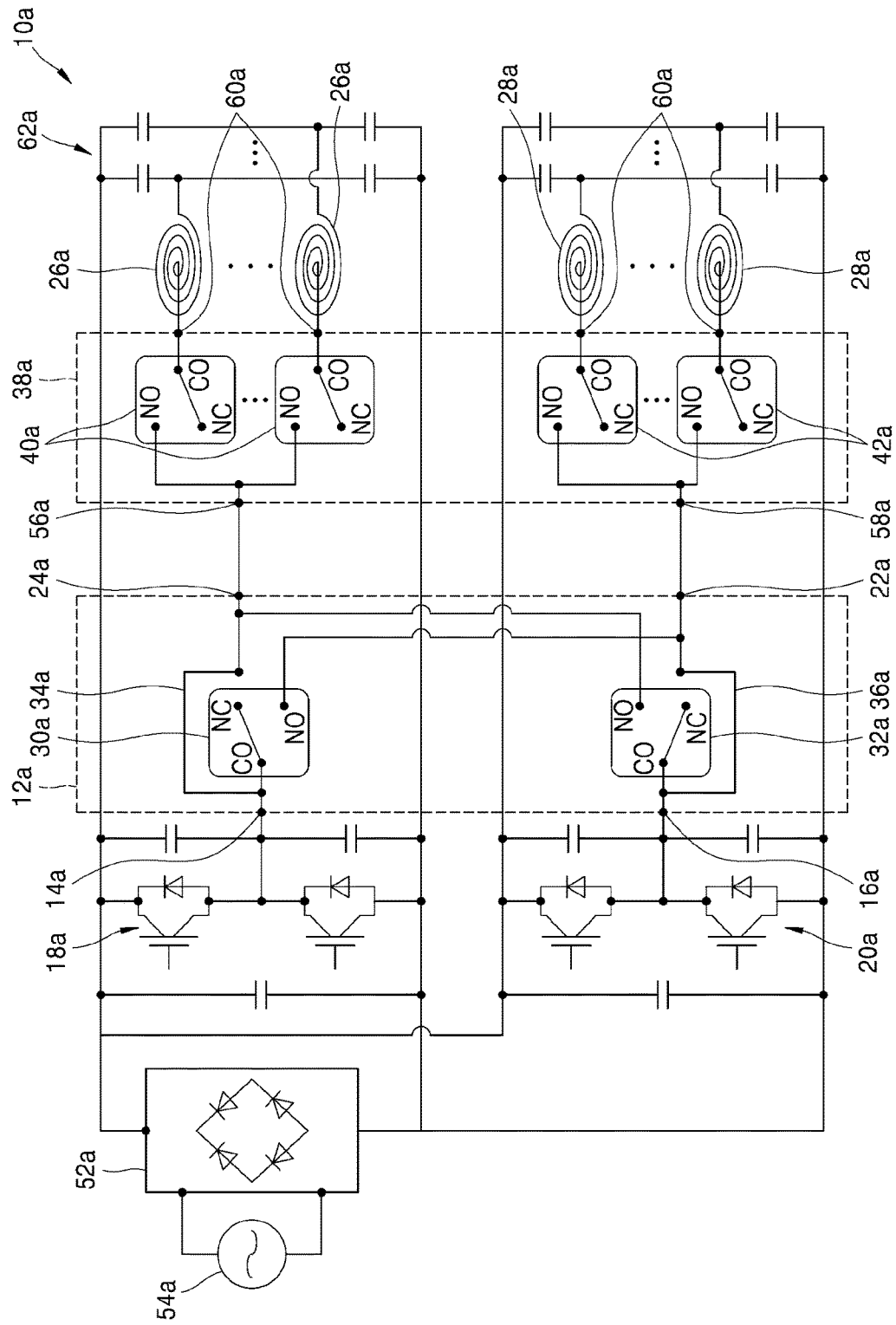
FIG. 1 is a block diagram illustrating a zone-free induction heating apparatus in related art.

One or more implementations of the present disclosure are described below with reference to the accompanying drawings. Through the drawings, like reference numerals denote like elements.

Hereinafter, an induction heating and wireless power transmission apparatus according to some implementations will be described.

Figure 2:
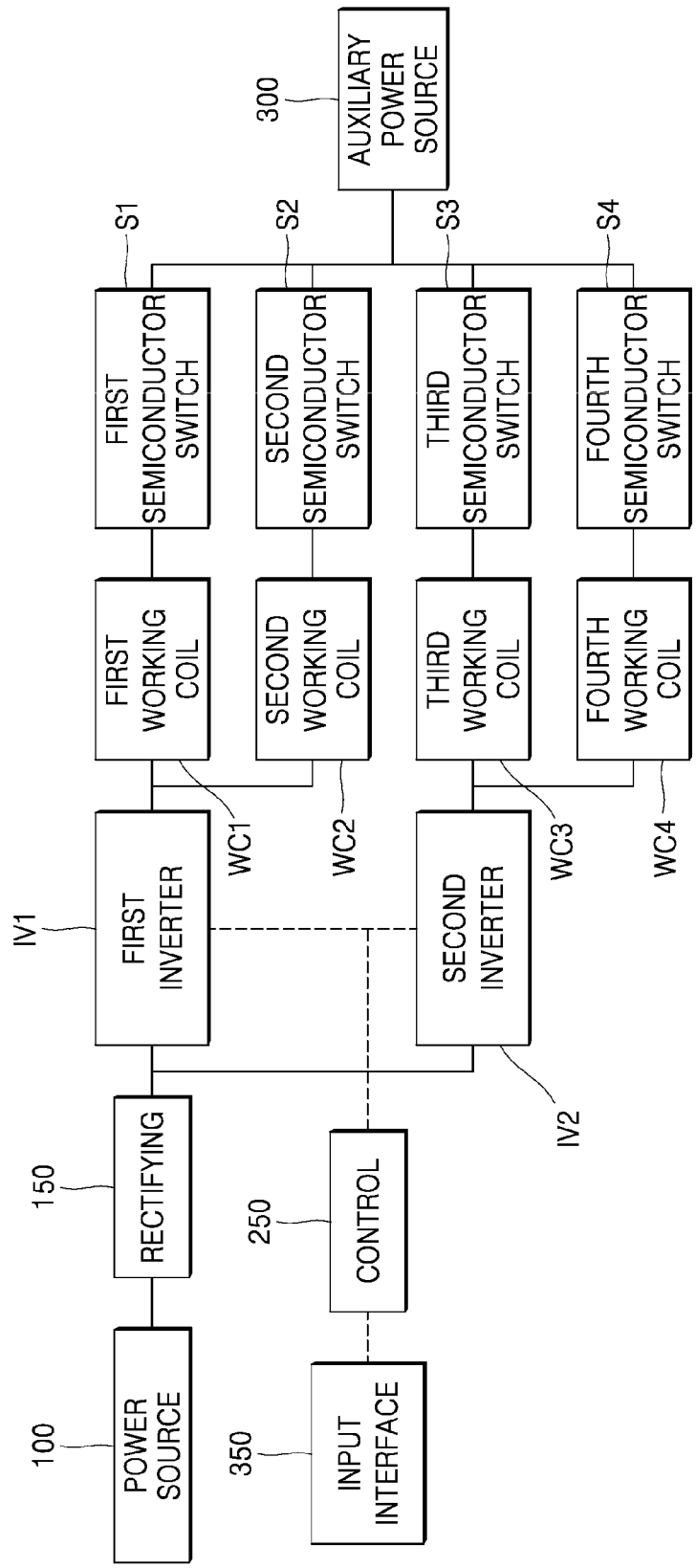
FIG. 2 is a block diagram illustrating an example of an induction heating and wireless power transmitting apparatus according to the disclosure.

FIG. 2 is a block diagram illustrating an example of an induction heating and wireless power transmitting apparatus.

Figure 8:
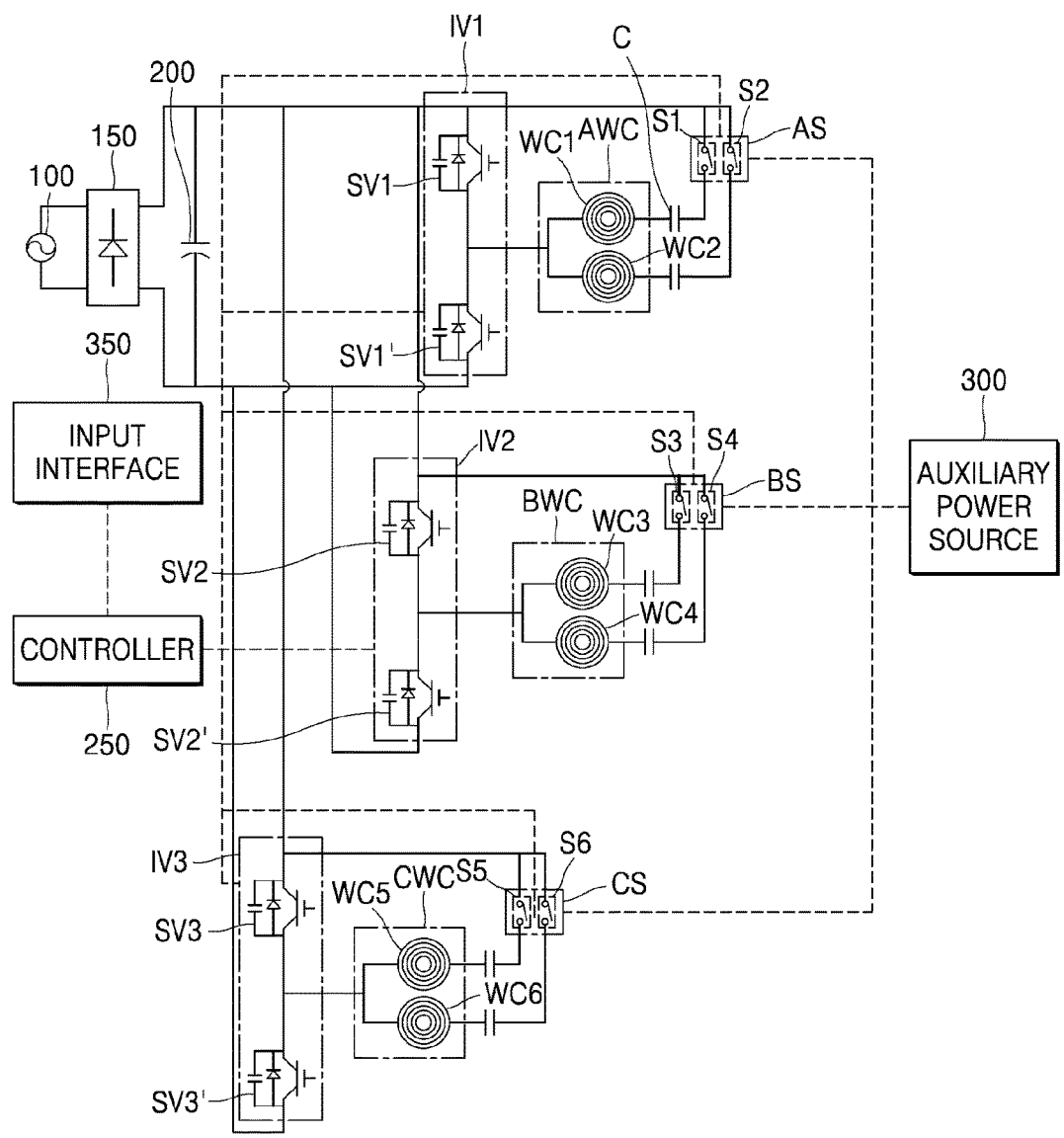
FIG. 8 is a circuit diagram illustrating another example of an induction heating and wireless power transmitting apparatus.
Figure 9:
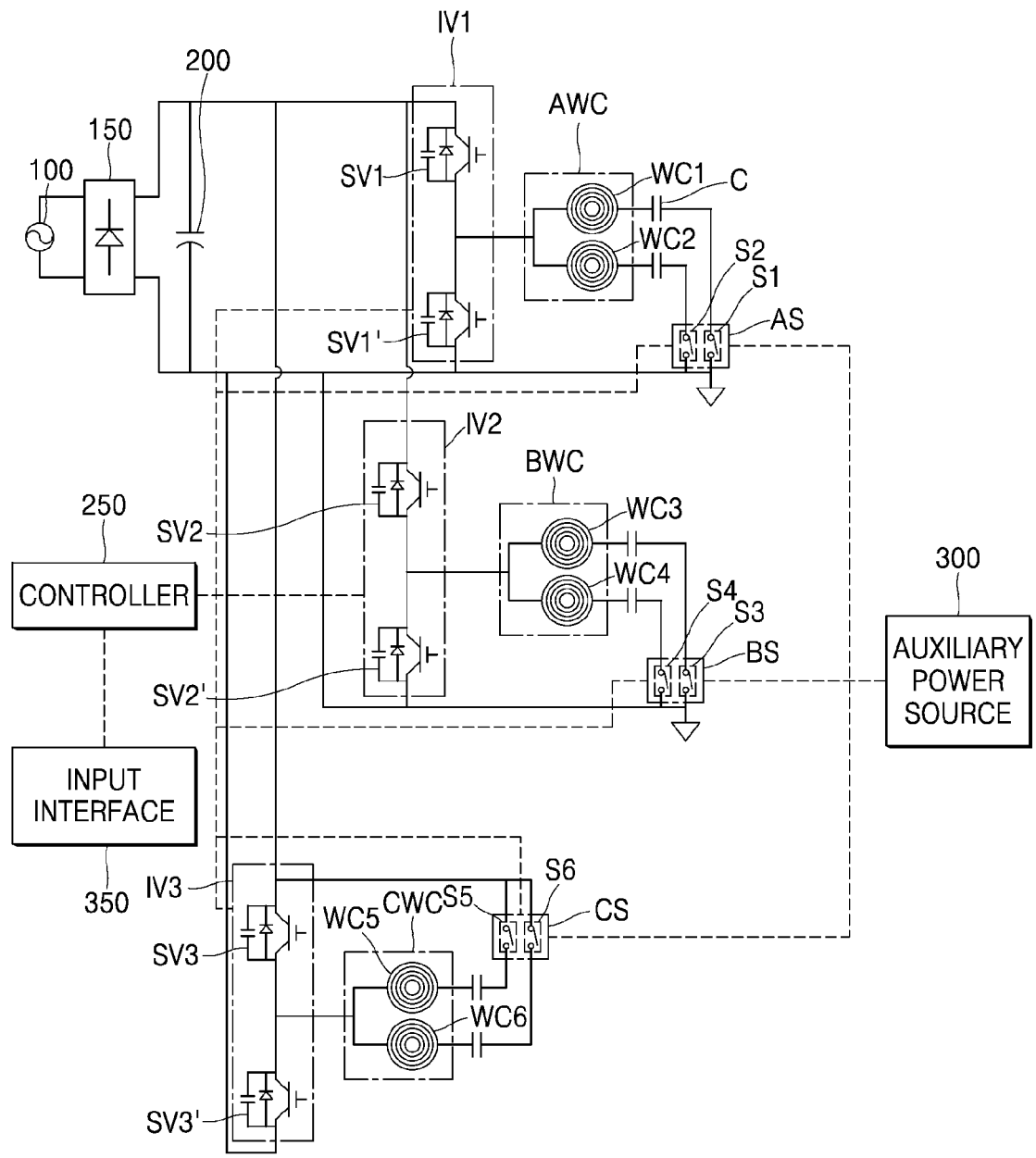
FIG. 9 is a circuit diagram illustrating another example of an induction heating and wireless power transmitting apparatus.

FIG. 2 may include contents that can be commonly applied to some other implementations, for example, devices shown in FIGS. 8 and 9.

Referring to FIG. 2, the induction heating and wireless power transmitting apparatus may include a power source 100, a rectifier 150, a first inverter IV1, a second inverter IV2, a controller 250, a first working coil WC1 to a fourth working coil WC4, a first semiconductor switch S1 to a fourth semiconductor switch S4, an auxiliary power source 300, and an input interface 350.

In some examples, the number of some of the components (e.g., the inverter, the working coil, the semiconductor switch and the like) of the induction heating and wireless power transmitting apparatus in FIG. 2 may vary.

The power source 100 may output alternating current (AC) power.

The power source 100 may output AC power and may supply the AC power to the rectifier 150. For example, the power source 100 may include a commercial power supply.

The rectifier 150 may convert the AC power received from the power source 100 into DC power, and may supply the DC power to at least one of the first inverter IV1 and the second inverter IV2.

The rectifier 150 may rectify the AC power received from the power source 100 and may convert the rectified AC power into DC power. For example, the rectifier 150 may include an electric circuit including one or more diodes.

In some examples, the DC power rectified by the rectifier 150 may be supplied to a filter unit, and the filter unit may remove an AC component left in the DC power. The DC power rectified by the rectifier 150 may be supplied to a DC link capacitor (not illustrated; a smoothing capacitor), and the DC link capacitor may reduce ripple of the DC power.

As described above, the DC power rectified by the rectifier 150 and the filter unit (or the DC link capacitor) may be supplied to at least one of the first inverter IV1 and the second inverter IV2.

In some examples, the controller 250 may include at least one of an electric circuit, one or more processors, a non-transitory memory, or a communication device.

The first inverter IV1 may performs switching operation to supply resonant currents to at least one of the first working coil WC1 to the fourth working coil WC4.

The switching operation of the first inverter IV1 may be controlled by the controller 250. That is, the first inverter IV1 may perform switching operation based on switching signals received from the controller 250.

The first inverter IV1 may include two switching elements, and the two switching elements may be alternately turned on and turned off by switching signals received from the controller 250.

High-frequency alternating currents (i.e., resonant currents) may be generated by switching operation of the two switching elements, and the generated high-frequency alternating currents may be supplied to at least one of the first working coil WC1 and the second working coil WC2.

In some implementations, the second inverter IV2 may perform switching operation to supply resonant currents to at least one of the third working coil WC3 and the fourth working coil WC4.

The switching operation of the second inverter IV2 may be controlled by the controller 250. That is, the second inverter IV2 may perform switching operation based on switching signals received from the controller 250.

The second inverter IV2 may include two switching elements, and the two switching elements may be alternately turned on and turned off by switching signals received from the controller 250.

High-frequency alternating currents (i.e., resonant currents) may be generated by switching operation of the two switching elements, and the generated high-frequency alternating currents may be supplied to at least one of the third working coil WC3 and the fourth working coil WC4.

The controller 250 may respectively control operations of the first inverter IV1 and the second inverter IV2, and operations of the first semiconductor switch S1 to the fourth semiconductor switch S4.

According to switching signals of the controller 250, switching operation of the first inverter IV1 and the second inverter IV2 may be controlled, and, according to control signals of the controller 250, the first semiconductor switch S1 to the fourth semiconductor switch S4 may be turned on or turned off in a consecutive manner, in a specific order or at the same time.

For example, when the first inverter IV1 is driven by switching signals of the controller 250, and the first semiconductor switch S1 is turned on by control signals of the controller 250, resonant currents may be supplied to the first working coil WC1.

As described above, an abject placed at an upper portion of the first working coil WC1 may be heated, or power may be wirelessly transmitted to the object, by the resonant currents supplied to the first working coil WC1.

The controller 250 may generate various switching signals or control signals through the pulse width modulation (PWM) function.

Additionally, driving mode, i.e., induction heating mode or wireless power transmitting mode of the induction heating and wireless power transmitting apparatus may be controlled by the controller 250.

That is, when driving mode of the induction heating and wireless power transmitting apparatus is set to wireless power transmitting mode by the controller 250, at least one of the first working coil WC1 to the fourth working coil WC4 may be driven and may wirelessly transmit power to an object.

When driving mode of the induction heating and wireless power transmitting apparatus is set to induction heating mode by the controller 250, at least one of the first working coil WC1 to the fourth working coil WC4 may be driven and may heat an object.

In some implementations, the number of driven working coils may be determined through control by the controller 250, and, based on the number of driven working coils, an amount of power transmitted by the induction heating and wireless power transmitting apparatus or heating intensity of the induction heating and wireless power transmitting apparatus may vary.

The controller 250 may detect resonant currents flowing through the first working coil WC1 to the fourth working coil WC4, and, based on the detected value, may determine a working coil where an object is placed among the first working coil WC1 to the fourth working coil WC4.

In some implementations, the controller 250 may also determine whether the object is a magnetic object or a non-magnetic object based on the detected value.

Specifically, when the object placed at the upper portion of the induction heating and wireless power transmitting apparatus is a magnetic object, a large amount of eddy currents are resonated while being induced from the working to the object. Accordingly, a relatively less amount of resonant currents flow through the working coil. When no object is placed at the upper portion of the induction heating and wireless power transmitting apparatus or when the object placed at the upper portion of the induction heating and wireless power transmitting apparatus is a non-magnetic object, the working coil is not resonated. Accordingly, a relatively large amount of resonant currents flow through the working coil.

When an amount of resonant currents flowing through the working coil is smaller than a preset reference amount of currents, the controller 250 may determine that an object to be driven is a magnetic object. When an amount of resonant currents flowing through the working coil is greater than or equal to the preset reference amount of currents, the controller 250 may determine that an object is a non-magnetic object.

In some examples, when an amount of resonant currents flowing through the working coil is smaller than a preset reference amount of currents, the controller 250 may determine that an object to be driven is present above the working coil. When an amount of resonant currents flowing through the working coil is greater than or equal to the preset reference amount of currents, the controller 250 may determine that an object is not present above the working coil.

In some implementations, the induction heating and wireless power transmitting apparatus may further include a detector that detects resonant currents flowing through the working coil, and the detector may perform the above-described object detection function.

For convenience of description, the controller 250 performing the object detection function is described as an example.

The first working coil WC1 and the second working coil WC2 may be connected in parallel with each other.

In detail, the first working coil WC1 and the second working coil WC2 may be connected in parallel with each other and may receive resonant currents from the first inverter IV1.

That is, when the driving mode of the induction heating and wireless power transmitting apparatus is the induction heating mode, eddy current may be generated between the working coil and the object based on the high-frequency AC applied to at least one of the first working coil WC1 and the second working coil WC2 from the first inverter IV1 to heat the object.

When the driving mode of the induction heating and wireless power transmitting apparatus is the wireless power transmission mode, magnetic field may also be generated by the working coil based on the high-frequency AC applied to at least one of the first working coil WC1 and the second working coil WC2 from the first inverter IV1. By doing so, electric currents may also flow through a coil in an object corresponding to the working coil, and the object may be charged by the electric currents flowing through the coil in the object.

The first working coil WC1 may be connected to the first semiconductor switch S1, and the second working coil WC2 may be connected to the second semiconductor switch S2.

Accordingly, each of the working coils may be turned on or turned off by the semiconductor switch corresponding to each of the working coil at high speed.

The third working coil WC3 and the fourth working coil WC may be connected in parallel with each other.

In detail, the third working coil WC3 and the fourth working coil WC may be connected in parallel with each other, and may receive resonant currents from the second inverter IV2.

That is, when the driving mode of the induction heating and wireless power transmitting apparatus is the induction heating mode, the eddy current may be generated between the working coil and the object based on the high-frequency AC applied to at least one of the third working coil WC3 and the fourth working coil WC4 from the second inverter IV2.

Further, when the driving mode of the induction heating and wireless power transmitting apparatus is the wireless power transmission mode, the magnetic field may be generated by the working coil based on the high-frequency AC applied to at least one of the third working coil WC3 and the fourth working coil WC4 from the second inverter IV2. By doing so, electric currents may also flow through a coil in an object corresponding to the working coil, and the object may be charged by the electric currents flowing through the coil in the object.

The third working coil WC3 may be connected to the third semiconductor switch (S3), and the fourth working coil WC4 may be connected to the fourth semiconductor switch (S4).

Accordingly, each of the working coils may be turned on or turned off by the semiconductor switch corresponding to each of the working coils at high speed.

In some examples, the turn-on or turn-off of the working coil performed by the semiconductor switch may refer a flow of resonance current applied to the working coil from the inverter being unblocked or blocked by the semiconductor switch.

In some implementations, each of the first semiconductor switch S1 to the fourth semiconductor switch S4 may be connected to each of the first working coil WC1 to the fourth working coil WC4 and may be supplied with power from the auxiliary power source 300, to turn on or turn off the first working coil WC1 to the fourth working coil WC4.

Specifically, the first semiconductor switch S1 may be connected to the first working coil WC1 to turn on or turn off the first working coil WC1, and the second semiconductor switch S2 may be connected to the second working coil WC2 to turn on or turn off the second working coil WC2. The third semiconductor switch S1 may be connected to the third working coil WC3 to turn on or turn off the third working coil WC3, and the fourth semiconductor switch S4 may be connected to the fourth working coil WC4 to turn on or turn off the fourth second working coil WC4.

The first semiconductor switch S1 and the second semiconductor switch S2 may be driven by the controller 250 to keep pace with the first inverter IV1, and may be used to detect whether an object is placed on the first working coil WC1 and the second working coil WC2 or to control an output from the first working coil WC1 and the second working coil WC2.

The third semiconductor switch S3 and the fourth semiconductor switch S4 may be driven by the controller 250 to keep pace with the second inverter IV2, and may be used to detect whether an object is placed on the third working coil WC3 and the fourth working coil WC4 or to control an output from the third working coil WC3 and the fourth working coil WC4.

The first semiconductor switch S1 to the fourth semiconductor switch S4, for example, may include a static switch. Further, for example, a metal oxide semiconductor field effect transistor (MOSFET) or an insulated gate bipolar mode transistor (IGBT) may be applied to the first semiconductor switch S1 to the fourth semiconductor switch S4.

The auxiliary power source 300 may supply power to the first semiconductor switch S1 to the fourth semiconductor switch S4.

The auxiliary power source 300 may have a single output structure. Accordingly, the auxiliary power source 300 may supply power to the first semiconductor switch S1 to the fourth semiconductor switch S4 as a single output. The auxiliary power source 300 with a single output structure may have fewer pins for a connection with the first semiconductor switch S1 to the fourth semiconductor switch S4 than an auxiliary power source with a multiple output structure.

In some examples, when capacity of a single output is too large (that is, far beyond a preset reference capacity), the auxiliary power source 300 may be designed to have a double output structure (a structure in which each of the output terminals divides a single output capacity into a capacity less than or equal to a preset reference capacity).

Details thereof will be described later.

In some examples, the auxiliary power source 300, for example, may include a switched mode power supply (SMPS) but may not be limited.

The input interface 350 may receive an input from a user and may supply the input to the controller 250.

The input interface 350, which is a module for inputting heating intensity desired by the user or a driving time period of the induction heating and wireless power transmitting apparatus and the like, may be implemented as a physical button, or a touch panel and the like in various ways.

The input interface 350, for example, may be provided with a power button, a lock button, a power level adjustment button (+, −), a timer adjustment button (+, −), a charge mode button and the like.

The input interface 350 may supply received input information to the controller 250, and the controller 250 may drive the induction heating and wireless power transmitting apparatus in various ways based on the input information received from the input interface 350. Examples in relation to this are described as follows.

When the user touches the power button provided at the input interface 350 for a predetermined time period in a state in which the induction heating and wireless power transmitting apparatus does not operate, the induction heating and wireless power transmitting apparatus may start to operate. When the user touches the power button for a predetermined time period in a state in which the induction heating and wireless power transmitting apparatus is operating, the induction heating and wireless power transmitting apparatus may stop operating.

When the user touches the lock button for a predetermined time period, all the other buttons may be in a non-operational state. Then when the user touches the lock button for a predetermined time period again, all the other buttons may be in an operational state.

When the user touches the power level adjustment button (+, −) in a state in which power is input, a current power level of the induction heating and wireless power transmitting apparatus may be displayed on the input interface 350 as numbers. With a touch of the power level adjustment button (+, −), the controller 250 may confirm that driving mode of the induction heating and wireless power transmitting apparatus is induction heating mode. Further, the controller 250 may adjust frequencies for switching operation of the first inverter IV1 and second inverter IV2 to correspond to the input power level.

The user may set a driving time period of the induction heating and wireless power transmitting apparatus by touching the timer adjustment button (+, −). The controller 250 may finish driving the induction heating and wireless power transmitting apparatus when the driving time period set by the user is over.

In this situation, when the induction heating and wireless power transmitting apparatus operates in induction heating mode, the driving time period of the induction heating and wireless power transmitting apparatus, which is set by the timer adjustment button (+, −), may be a time period for heating an object. When the induction heating and wireless power transmitting apparatus operates in wireless power transmitting mode, a driving time period of the induction heating and wireless power transmitting apparatus, which is set by the timer adjustment button (+, −), may be a time period for charging an object.

When the user touches the charge mode button, the induction heating and wireless power transmitting apparatus may operate in wireless power transmitting mode.

In this situation, the controller 250 may receive device information on an object through communication with the object placed at a drive area (i.e., an upper portion of the working coil). The device information transmitted by the object, for example, may include information on the type of the object, charge mode, a required amount of power.

The controller 250 may determine the type of an abject, and may find out charge mode of an object, based on the received device information.

The charge mode of an object may include ordinary charge mode and high-speed charge mode.

Accordingly, the controller 250 may adjust frequencies of at least one of the first inverter IV1 and second inverter IV2 based on the confirmed charge mode. For example, in a high-speed charge mode, the controller 250 may adjust frequencies such that bigger resonant currents are supplied to the working coil based on switching operation of the inverter.

The change mode of an object may also be input by the user through the input interface 350.

The induction heating and wireless power transmitting apparatus 1 to 3 according to some implementations may have the above-described features and configurations in common.

Below, based on the features and configuration of the above-described induction heating and wireless power transmission apparatus, the induction heating and wireless power transmitting apparatus according to an implementation of the present disclosure will be described based on the difference from FIG. 2.

Figure 3:
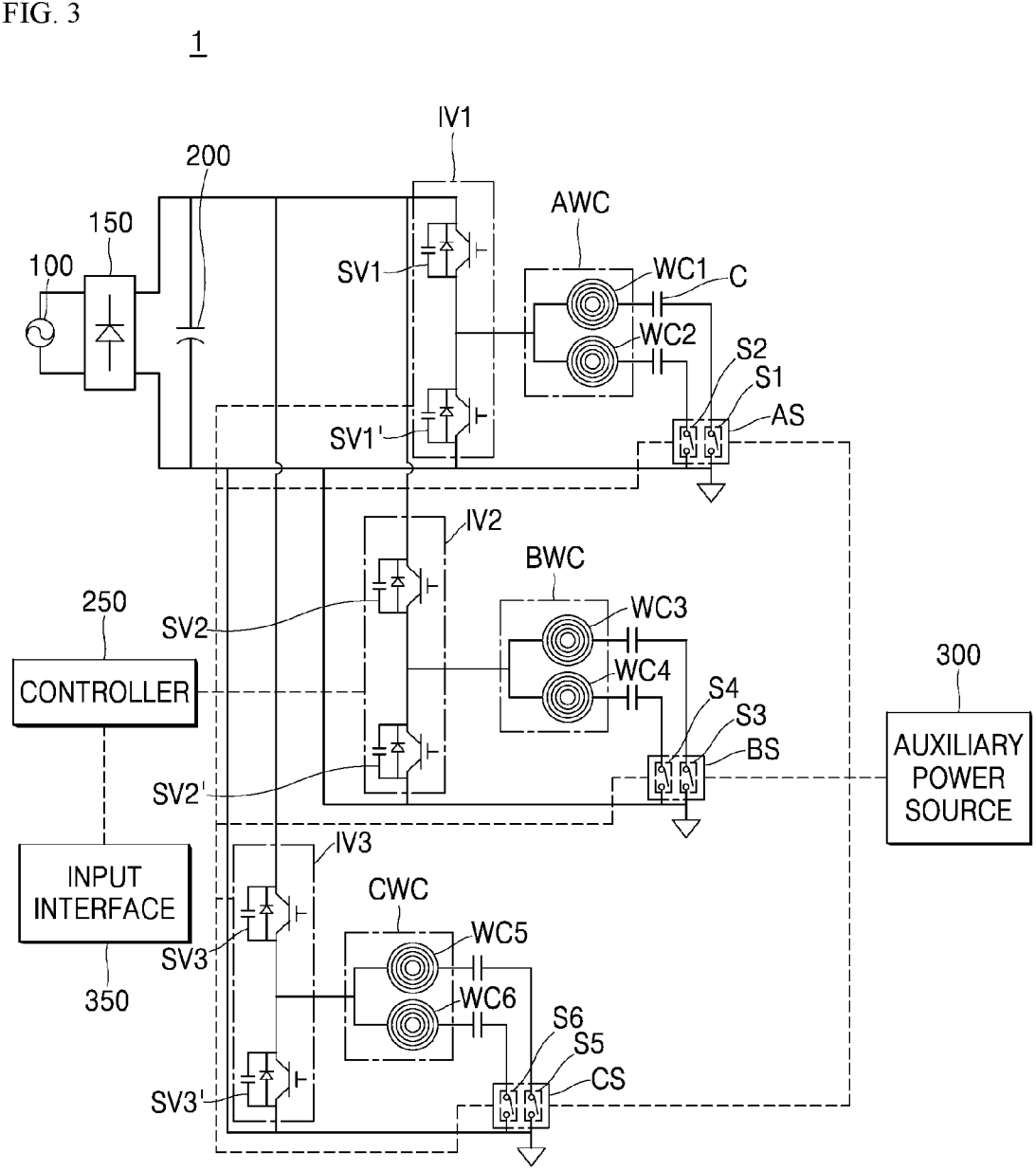
FIG. 3 is a circuit diagram illustrating the induction heating and wireless power transmitting apparatus.
Figure 4:
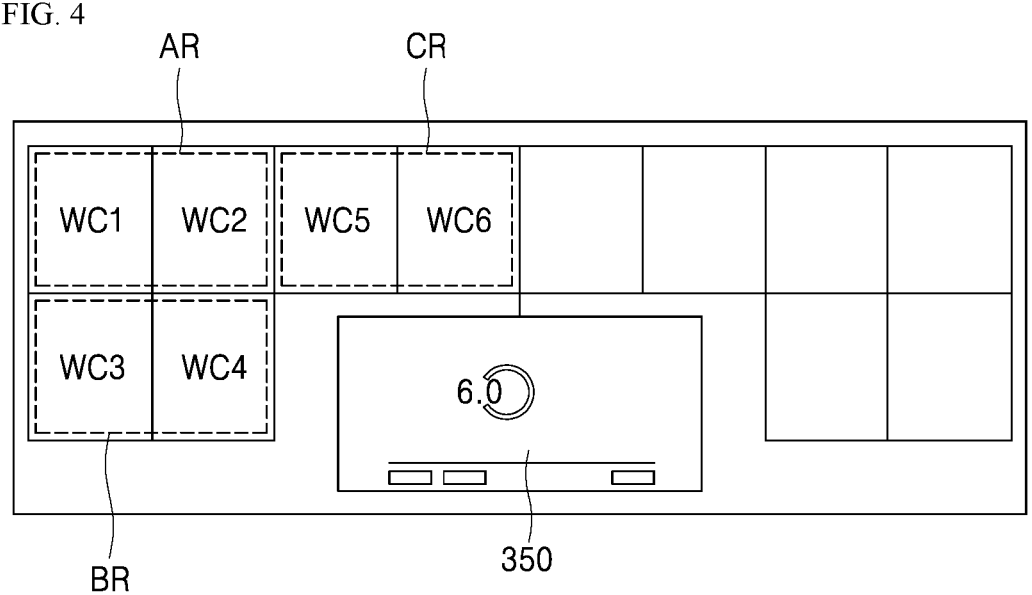
FIG. 4 is a schematic view illustrating an example of an arrangement of example working coils of the apparatus in FIG. 3.
Figure 5:
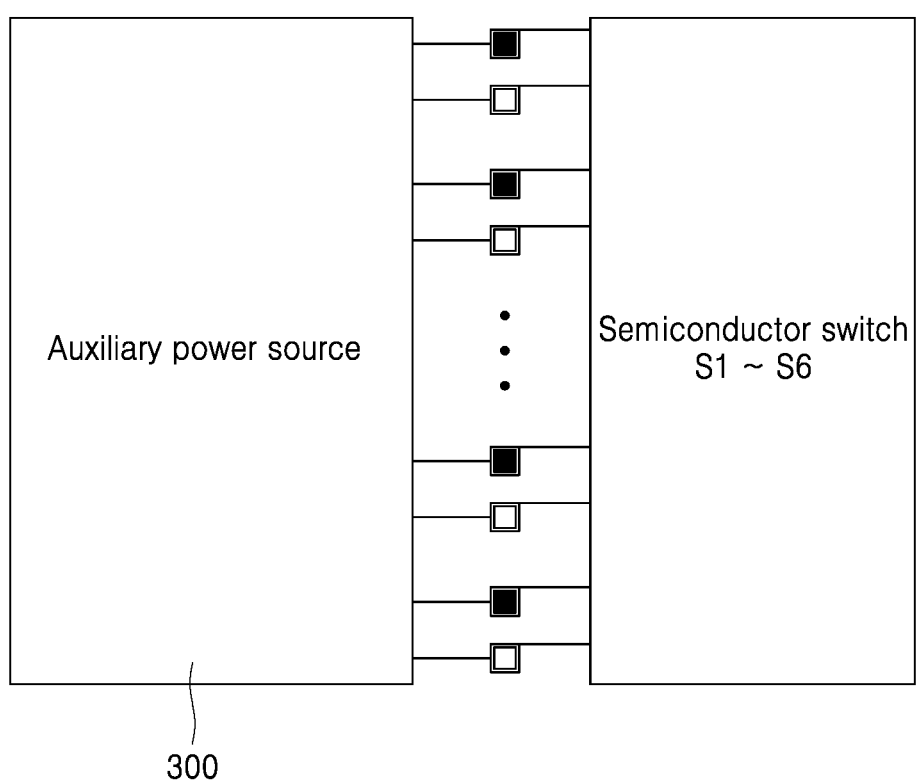
FIGS. 5 and 6 are schematic diagrams illustrating examples of connection structures between an example auxiliary power supply and example semiconductor switches of the apparatus in FIG. 3.
Figure 6:
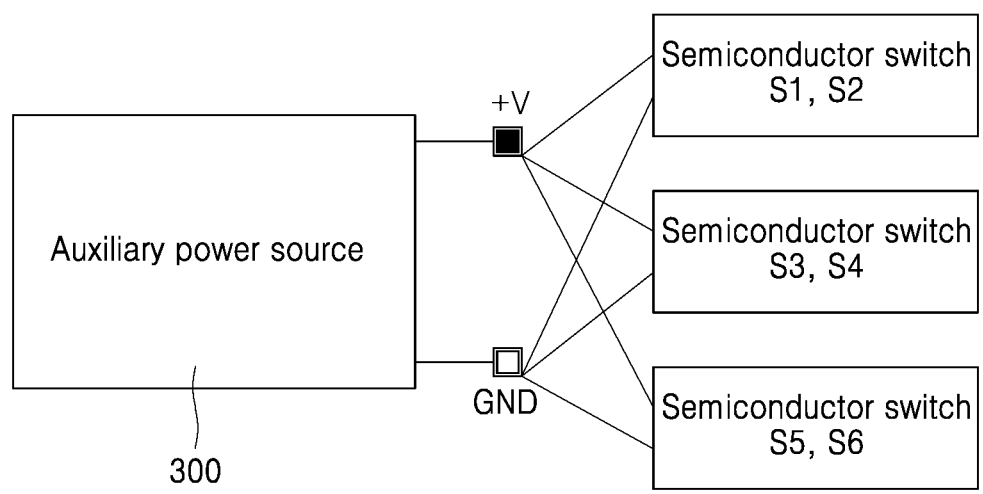
Figure 7:
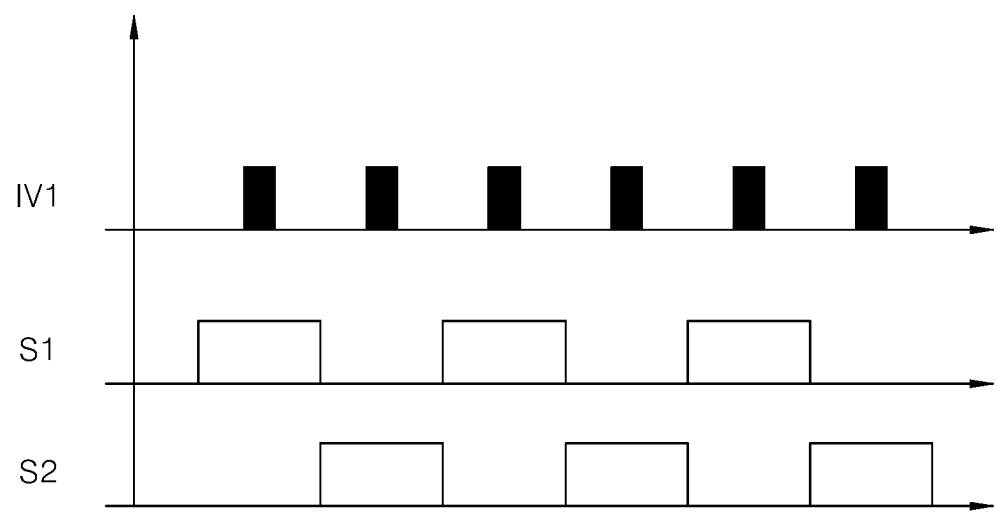
FIG. 7 is schematic view illustrating an example of an object detection method of the apparatus in FIG. 3.

FIG. 3 is a circuit diagram illustrating an example of ab induction heating and wireless power transmitting apparatus. FIG. 4 is a schematic view illustrating an example of an arrangement of example working coils in FIG. 2. FIGS. 5 and 6 are schematic diagrams illustrating examples of connection structures between an example auxiliary power supply and example semiconductor switches in FIG. 2. FIG. 7 is schematic view illustrating an example of an object detection method of the induction heating and wireless power transmitting apparatus in FIG. 2.

In some examples, the induction heating and wireless power transmitting apparatus in FIG. 3 may have the same configurations and features as the induction heating and wireless power transmitting apparatus in FIG. 2. However, for convenience of description, the number and the name of some of the components may differ.

Further, as shown in FIG. 4, only the working coils included within a first half of an entire area (a zone-free area) is shown in FIG. 3. FIG. 3 may further include an additional inverter, a working coil portion, a working coil, a detection group, a detector, a semiconductor switch portion, and a semiconductor switch to form a second half thereof.

For convenience of description, the inverter, the working coil portion, the working coil, the detector group, the detector, the semiconductor switch portion, and the semiconductor switch in FIG. 3 are described as examples.

Referring to FIG. 3, an induction heating and wireless power transmitting apparatus 1 may include a power source 100, a rectifier 150, a DC link capacitor 200, a first inverter IV1 to a third inverter IV3, a first working coil portion AWC, a second working coil portion BWC, a third working coil portion CWC, a first semiconductor switch portion AS, a second semiconductor switch portion BS, third semiconductor switch portion CS, a controller 250, auxiliary power source 300, and an input interface 350.

The number of the inverter, the working coil portion, the working coil, the semiconductor switch portion, the semiconductor switch may not be limited to the number of the components illustrated in FIG. 3 and may vary.

For example, the first working coil portion AWC includes six working coils, the second working coil portion BWC includes four working coils, the third working coil portion CWC includes six working coils, the first semiconductor switch AS includes six semiconductor switches, the second semiconductor switch BS includes four semiconductor switches, and the third semiconductor switch CS includes six semiconductor switches. It may be the best mode of the induction heating and wireless power transmitting apparatus 1.

However, for convenience of description, it is assumed that each working coil portion includes two working coils, and each semiconductor switch portion includes two semiconductor switches.

The power source 100 may output AC power and may supply the AC power to the rectifier 150, and the rectifier 150 may convert the AC power received from the power source 100 into DC power and may supply the DC power to the DC link capacitor 200.

The DC link capacitor 200 may be connected in parallel with the rectifier 150.

Specifically, the DC link capacitor 200 may be connected in parallel with the rectifier 150 and may receive a DC voltage from the rectifier 150. The DC link capacitor 200, for example, may be a smoothing capacitor. Accordingly, the DC link capacitor 200 may reduce ripple of the received DC voltage.

In the case of a DC link capacitor 200 that receives a DC voltage from the rectifier 150, one end of the DC link capacitor may be supplied with a DC voltage and the other end may be grounded by a potential difference between one end and the other end of the DC link capacitor 200.

The DC power (or the DC voltage) which is rectified by the rectifier 150 and the ripple of which is reduced by the DC link capacitor 200 may be supplied to at least one of the first inverter IV1 to third inverter IV3.

The first inverter IV1 may include two switching elements SV1, and SV1', the second inverter IV2 may include two switching elements SV2, and SV2', and the third inverter IV3 may include two switching elements SV3, and SV3'.

The switching elements included in each of the inverters IV1 to IV3 are alternately turned on and turned off by switching signals received by the controller 250 to convert the DC power into high-frequency alternating currents (i.e., resonant currents), and the converted high-frequency alternating currents may be supplied to the working coil.

For example, the resonant currents converted through the switching operation of the first inverter IV1 may be supplied to the first working coil portion AWC, and the resonant currents converted through the switching operation of the second inverter IV2 may be supplied to the second working coil portion BWC. Additionally, the resonant currents converted through the switching operation of the third inverter IV3 may be supplied to the third working coil portion CWC.

Certainly, resonant currents generated by the first inverter IV1 may be supplied to at least one of the working coils WC1 and WC2 included in the first working coil portion AWC, and resonant currents generated by the second inverter IV2 may be supplied to at least one of the working coils WC3 and WC4 included in the second working coil portion BWC. Additionally, resonant currents generated by the third inverter IV3 may be supplied to at least one of the working coils WC5 and WC6 included in the third working coil portion CWC.

The working coils WC1 and WC2 included in the first working coil portion AWC are connected in parallel with each other, and the working coils WC3 and WC4 included in the second working coil portion BWC are also connected in parallel with each other. Additionally, the working coils WC5 and WC6 included in the third working coil portion CWC are also connected in parallel with each other.

Accordingly, as illustrated in FIG. 4, the working coils WC1 and WC2 included in the first working coil portion AWC are grouped and placed at area A AR, the working coils WC3 and WC4 included in the second working coil portion BWC are grouped and placed at area B BR, and the working coils WC5 and WC6 included in the third working coil portion CWC are grouped and placed at area C (CR).

The working coils may also be placed in the rest vacant space, and the input interface 350 may also be placed at another position except the position illustrated in FIG. 4.

Referring back to FIG. 3, the first semiconductor switch portion AS may be connected to the first working coil portion AWC, the second semiconductor switch portion BS may be connected to the second working coil portion BWC, and the third semiconductor switch portion CS may be connected to the third working coil portion CWC.

Specifically, the first semiconductor switch portion AS may include two semiconductor switches S1 and S2, and each of the two semiconductor switches S1 and S2 may be connected to each of the two working coils WC1 and WC2 included in the first working coil portion AWC and may turn on or turn off each of the two working coils WC1 and WC2.

One end of each of the two semiconductor switches S1 and S2 may be connected to each of the two working coils WC1 and WC2, and the other end of each of the two semiconductor switches S1 and S2 may be connected to the other end (i.e., a ground end) of the DC link capacitor 200.

The second semiconductor switch portion BS may include two semiconductor switches S3 and S4, and each of the two semiconductor switches S3 and S4 may be connected to each of the two working coils WC3 and WC4 included in the second working coil portion BWC and may turn on or turn off each of the two working coils WC3 and WC4.

One end of each of the two semiconductor switches S3 and S4 may be connected to each of the two working coils WC3 and WC4, and the other end of each of the two semiconductor switches S3 and S4 may be connected to the other end (i.e., a ground end) of the DC link capacitor 200.

The third semiconductor switch portion CS may include two semiconductor switches S5 and S6, and each of the two semiconductor switches S5 and S6 may be connected to each of the two working coils WC5 and WC6 included in the third working coil portion CWC and may turn on or turn off each of the two working coils WC5 and WC6.

One end of each of the two semiconductor switches S5 and S6 may be connected to each of the two working coils WC5 and WC6, and the other end of each of the two semiconductor switches S5 and S6 may be connected to the other end (i.e., a ground end) of the DC link capacitor 200.

That is, the other end of all the semiconductor switches of the first semiconductor switch portion AS, second semiconductor switch portion BS and third semiconductor switch portion CS may be connected to the other end (i.e., a ground end) of the DC link capacitor 200. By doing so, the auxiliary power source 300 may supply power to all the semiconductor switches through a single output terminal. In some examples, the auxiliary power source 300 may include a power supply.

In some examples, when the semiconductor switch is connected between the inverter and the working coil portion, an emitter of each of the semiconductor switches floats, and the number of output terminals of the auxiliary power source 300 increases as many as the number of semiconductor switches, as shown in FIG. 5. Accordingly, the number of pins of the auxiliary power source 300 may increase and volume of a circuit may also increase.

In some examples, when the semiconductor switches are all connected to the ground end (i.e., the other end of the DC link capacitor 200) as shown in FIG. 6, the emitters of the semiconductor switches may not float but may be common. Accordingly, the auxiliary power source 300 may supply power to all the semiconductor switches through a signal output terminal. When the semiconductor switches are all connected to the ground end. Further, the number of pins of the auxiliary power source 300 may be reduced compared to FIG. 5, and volume of a circuit may also be reduced than when an emitter of the semiconductor switch floats.

Referring back to FIG. 3, the controller 250 may respectively control operations of the first inverter IV1 to third inverter IV3 and the first semiconductor switch portion AS to third semiconductor switch portion CS.

Additionally, the controller 250 may detect resonant currents flowing through at least one of the working coils WC1 to WC6 included in the first working coil portion AWC, the second working coil portion BWC and the third working coil portion CWC, and may determine a working coil where an object is placed based on a detected value.

Here, the process of detecting the object will be described with reference to FIGS. 3 and 7.

For convenience of description, a process of detecting an object at area A (AR in FIG. 4) in which the first working coil portion AWC is placed is provided as an example.

In order to detect an object, N pulses may be provided to the first inverter unit IV1 at regular intervals (N denotes any one of 1, 2, and 3, and, when N is 1, the controller 250 may supply one pulse shot to the first inverter IV1 as a switching signal).

When the first inverter IV1 receives N pulses from the controller 250, the first inverter IV1 may be turned on and off. By doing so, free resonance may be generated in a circuit including the first working coil portion AWC.

When the controller 250 supplies continuous pulses (e.g., four or more pulses), not the N numbers of pulses, there may be a problem with standby power. Accordingly, the controller 250 supplies the N numbers of pulses to the first inverter IV1 periodically.

For convenience of description, an example in which the N numbers of pulses is one pulse (i.e., a single pulse) is provided hereunder.

The controller 250 may consecutively turn on or turn off the two semiconductor switches S1 and S4 in accordance with each single pulse.

That is, when the controller 250 provides a single pulse to the first inverter IV1 after turning on the first semiconductor switch S1, the resonance current flows only in the first working coil WC1, and the controller 250 may detect attenuation of the resonance current flowing in the first working coil WC1 and determine whether the object is placed on the first working coil WC1.

In detail, when the object is placed on the first working coil WC1, the overall resistance may increase due to the resistance of the object, thereby increasing the attenuation of the resonance current flowing through the first working coil WC1. Thus, a value corresponding to the resonance current may decrease when the object is placed on the first working coil WC1.

The controller 250 detects the resonance current flowing in the first working coil WC1 as described above, and determines whether the object is placed on the first working coil WC1 based on the detected value.

In some examples, the controller 250 may have a delay of a predetermined time before and after providing a single pulse.

For example, the controller 250 may provide the single pulse to the first inverter unit IV1 when a delay (that is, a first delay) for a predetermined time elapses after turning on the first semiconductor switch S1. Herein, the reason for having the first delay elapsed time is that a certain time is required for the first semiconductor switch S1 to stabilize after turning on.

Next, a second delay for a predetermined time period may pass again after the single pulse is supplied to the first inverter IV1. Herein, the reason for having second delay elapsed time is that a certain time is required for signal processing for a single pulse provided to the first inverter unit IV1 and sensing for the object.

In addition, as described above, the controller 250 may determine whether the object is also placed with respect to the second working coil WC2, and may continuously repeat this process.

The above-described process of detecting the object may be applied to the second workings coil portion BWC and third workings coil portion CWC as well as the first working coil portion AWC.

In some implementations, the induction heating and wireless power transmitting apparatus 1 may further include a resonance capacitor C connected between the working coil and the semiconductor switch.

In the case, when a voltage is applied by the switching operation of the inverter (for example, the first inverter IV1), the resonance capacitor C resonates. In addition, when the resonant capacitor C resonates, a current flowing through the working coil (for example, WC1) connected to the resonant capacitor C increases.

Through this process, the eddy current is induced to the object disposed on the working coil connected to the resonance capacitor C.

The induction heating and wireless power transmitting apparatus 1, as described above, may independently separate the plurality of working coils and may turn on or turn off the plurality of working coils at high speed through the semiconductor switches, thereby ensuring a higher detection speed of an object and improving user satisfaction.

Further, the induction heating and wireless power transmitting apparatus 1 performs operation of detecting the object through the semiconductor switches, without a relay, thereby reducing noise generated at the time of the switchover operation of a relay and satisfying the needs of users. The induction heating and wireless power transmitting apparatus 1 may be used even during a time period for which people are sensitive to noise (e.g., at dawn or late at night), thereby ensuring improved usability.

In addition, the induction heating and wireless power transmitting apparatus 1 may reduce volume of the circuit by not including the relay and the object detection circuit, thereby, reducing the total volume of the induction heating and wireless power transmitting apparatus 1. Furthermore, space utilization may be improved by reducing the overall volume of the induction heating and wireless power transmitting apparatus 1.

Hereinafter, the induction heating and wireless power transmitting apparatus will be described with reference to FIG. 8.

FIG. 8 is a circuit diagram illustrating an example of an induction heating and wireless power transmitting apparatus.

In some examples, the induction heating and wireless power transmitting apparatus 2 shown in FIG. 8 is substantially the same in configuration and effect as the induction heating and wireless power transmitting apparatus 1 shown in FIG. 3. Therefore, the following description will focus on the differences.

Specifically, the induction heating and wireless power transmitting apparatus 2 may be different in connection position of the semiconductor switch as compared with the induction heating and wireless power transmitting apparatus 1 of FIG. 3.

That is, as shown in FIG. 8, the other end of each of the two semiconductor switches S1 and S2 of the first semiconductor switch portion AS may be connected to one end of the DC link capacitor 200 (i.e. the part where DC voltage is applied) instead of the other end of the DC link capacitor 200.

Further, the other end of each of the two semiconductor switches S3 and S4 of the second semiconductor switch portion BS may be connected to one end of the DC link capacitor 200 (i.e. the part where DC voltage is applied).

In some examples, the other end of each of the two semiconductor switches S5 and S6 of the third semiconductor switch portion CS may be connected to one end of the DC link capacitor 200 (i.e. the part where DC voltage is applied).

That is, the other end of all the semiconductor switches of the first to third semiconductor switch portion AS, BS, CS may be connected to one end of the DC link capacitor 200 (i.e. the part where DC voltage is applied). As a result, as shown in FIG. 3, the auxiliary power source 300 of FIG. 8 may supply power to all the semiconductor switches through one output terminal.

Hereinafter, another example of an induction heating and wireless power transmitting apparatus will be described with reference to FIG. 9.

FIG. 9 is a circuit diagram illustrating an example of an induction heating and wireless power transmitting apparatus.

The induction heating and wireless power transmitting apparatus 3 shown in FIG. 9 may be substantially the same in configuration and effect as the induction heating and wireless power transmitting apparatus 1 shown in FIG. 3. Therefore, the following description will focus on the differences.

Specifically, the induction heating and wireless power transmitting apparatus 3 may be partly different in the connection position of the semiconductor switch as compared with the induction heating and wireless power transmitting apparatus 1 of FIG. 3.

That is, the other end of each of the two semiconductor switches S1 and S2 of the first semiconductor switch portion AS is connected to the other end of the DC link capacitor 200 (i.e. the ground end), the other end of each of the two semiconductor switches S3 and S4 of the second semiconductor switch portion BS is connected to the other end of the DC link capacitor 200 (i.e. the ground end). This is the same as the induction heating and wireless power transmitting apparatus 1 of FIG. 3.

However, the other end of each of the two semiconductor switches S5 and S6 of the third semiconductor switch portion CS may be connected to one end of the DC link capacitor 200 (i.e. the part where DC voltage is applied).

This is different from the induction heating and wireless power transmitting apparatus 1 of FIG. 3.

That is, the other end of each of the semiconductor switches of the first and second semiconductor switch portions AS and BS may be connected to the other end of the DC link capacitor 200 (i.e. the ground end), and the other end of each of the semiconductor switches of the third semiconductor switch portion C may be connected to one end of the DC link capacitor 200 (i.e. the part where DC voltage is applied).

Accordingly, the auxiliary power source 300 of FIG. 9 may supply power to all of the semiconductor switches through two output terminals, unlike FIG. 3.

As shown in FIG. 9, when the single output capacity of the auxiliary power source 300 is too large (i.e. when the single output capacity of the auxiliary power source 300 greatly exceeds the preset reference capacity), problems may occur in the circuit and the entire system, thus, the auxiliary power source 300 supplies power through two output terminals.

Accordingly, when the single output capacity of the auxiliary power source 300 is too large, the output terminal of the auxiliary power source 300 is divided into two terminals as shown in FIG. 9. Therefore, power of an appropriate capacity (that is, a capacity less than or equal to a predetermined reference capacity) may be output through each output terminal.

In some examples, the connection relationship of each semiconductor switch portion is not limited to the connection relationship shown in FIG. 9.

That is, the other end of each of the semiconductor switches included in some semiconductor switch portion among the first to third semiconductor switch portion AS, BS, and CS may be connected to the other end (i.e. the ground end) of the DC link capacitor 200, and the other end of each of the semiconductor switches included in the remaining semiconductor switch portion may be connected to one end (i.e. the part where DC voltage is applied) of the DC link capacitor 200.

The present disclosure, described above, may be replaced, modified and changed in various different forms without departing from the technical spirit of the disclosure by one having ordinary skill in the art to which the disclosure pertains. Thus, the present disclosure should not be construed as being limited to the implementations and drawings set forth herein.

The invention claimed is:

1. An apparatus for induction heating and wireless power transmission, the apparatus comprising:
   a first group of working coils comprising a first working coil and a second working coil that are electrically connected to each other in parallel;
   a first inverter configured to perform a first switching operation to generate a first resonant current in at least one of the first working coil or the second working coil;
   a first semiconductor switch that is connected to the first working coil and that is configured to turn on and turn off the first working coil;
   a second semiconductor switch that is connected to the second working coil and that is configured to turn on and turn off the second working coil;
   an auxiliary power supply configured to supply power to the first semiconductor switch and the second semiconductor switch; and
   a controller configured to control the first inverter, the first semiconductor switch, and the second semiconductor switch.

2. The apparatus of claim 1, further comprising:
a rectifier configured to convert alternating current (AC) power supplied from a power supply to direct current (DC) power and to supply the DC power to the first inverter,
wherein the first inverter is configured to convert the DC power supplied from the rectifier into the first resonant current; and
a DC link capacitor that is electrically connected in parallel to the rectifier, the DC link capacitor having a first end configured to receive a DC voltage corresponding to the DC power and a second end connected to ground.

3. The apparatus of claim 2, wherein the first semiconductor switch has a first end connected to the first working coil and a second end connected to the second end of the DC link capacitor, and
wherein the second semiconductor switch has a first end connected to the second working coil and a second end connected to the second end of the DC link capacitor.

4. The apparatus of claim 2, wherein the first semiconductor switch has a first end connected to the first working coil and a second end connected to the first end of the DC link capacitor, and
wherein the second semiconductor switch has a first end connected to the second working coil and
a second end connected to the first end of the DC link capacitor.

5. The apparatus of claim 1, further comprising:
a second group of working coils comprising a third working coil and a fourth working coil that are electrically connected to each other in parallel;
a second inverter that is electrically connected in parallel to the first inverter and that is configured to perform a second switching operation to generate a second resonant current in at least one of the third working coil or the fourth working coil;
a third semiconductor switch that is connected to the third working coil and that is configured to turn on and turn off the third working coil;
a fourth semiconductor switch that is connected to the fourth working coil and that is configured to turn on and turn off the fourth working coil;
a rectifier that is configured to convert alternating current (AC) power supplied from a power supply to direct current (DC) power and to supply the DC power to at least one of the first inverter or the second inverter; and
a DC link capacitor that is electrically connected in parallel to the rectifier,
the DC link capacitor having a first end configured to receive a DC voltage corresponding to the DC power and a second end connected to ground.

6. The apparatus of claim 5, wherein the auxiliary power supply is configured to supply power to the third semiconductor switch and the fourth semiconductor switch, and
wherein the controller is configured to control the second inverter, the third semiconductor switch, and the fourth semiconductor switch.

7. The apparatus of claim 5, wherein the first semiconductor switch has a first end connected to the first working coil and a second end connected to the second end of the DC link capacitor,
wherein the second semiconductor switch has a first end connected to the second working coil and a second end connected to the second end of the DC link capacitor,
wherein the third semiconductor switch has a first end connected to the third working coil and a second end connected to the second end of the DC link capacitor, and
wherein the fourth semiconductor switch has a first end connected to the fourth working coil and a second end connected to the second end of the DC link capacitor.

8. The apparatus of claim 7, wherein the auxiliary power supply comprises one output terminal that is configured to supply power to the first semiconductor switch, the second semiconductor switch, the third semiconductor switch, and the fourth semiconductor switch.

9. The apparatus of claim 5, wherein the first semiconductor switch has a first end connected to the first working coil and a second end connected to the first end of the DC link capacitor,
wherein the second semiconductor switch has a first end connected to the second working coil and a second end connected to the first end of the DC link capacitor,
wherein the third semiconductor switch has a first end connected to the third working coil and a second end connected to the first end of the DC link capacitor, and
wherein the fourth semiconductor switch has a first end connected to the fourth working coil and a second end connected to the first end of the DC link capacitor.

10. The apparatus of claim 9, wherein the auxiliary power supply comprises one output terminal that is configured to supply power to all of the first semiconductor switch, the second semiconductor switch, the third semiconductor switch, and the fourth semiconductor switch.

11. The apparatus of claim 5, wherein the first semiconductor switch has a first end connected to the first working coil,
wherein the second semiconductor switch has a first end connected to the second working coil,
wherein the third semiconductor switch has a first end connected to the third working coil,
wherein the fourth semiconductor switch has a first end connected to the fourth working coil,
wherein the first end of the DC link capacitor is connected to second ends of a first group of semiconductor switches among the first semiconductor switch, the second semiconductor switch, the third semiconductor switch, and the fourth semiconductor switch, and
wherein the second end of the DC link capacitor is connected to second ends of a second group of semiconductor switches among the first semiconductor switch, the second semiconductor switch, the third semiconductor switch, and the fourth semiconductor switch.

12. The apparatus of claim 11, wherein the auxiliary power supply is configured to supply power to the first group of semiconductor switches and the second group of semiconductor switches.

13. The apparatus of claim 5, wherein the controller is configured to:
detect a resonance current in at least one of the first working coil, the second working coil, the third working coil or the fourth working coil; and
based on a value of the detected resonance current, determine whether an object is placed above any one working coil among the first working coil, the second working coil, the third working coil, and the fourth working coil.

14. The apparatus of claim 5, wherein the auxiliary power supply comprises one ground terminal that is connected to all of the first semiconductor switch, the second semiconductor switch, the third semiconductor switch, and the fourth semiconductor switch.

15. The apparatus of claim 1, wherein each of the first semiconductor switch and the second semiconductor switch comprises at least one of a metal oxide semiconductor field effect transistor (MOSFET) or an insulated gate bipolar mode transistor (IGBT).

16. The apparatus of claim 1, where the controller is configured to:
provide a plurality of pulses to the first inverter;
apply a first portion of the plurality of pulses to the first semiconductor switch;
detect a first resonance current generated in the first working coil in response to the first portion of the plurality of pulses applied to the first semiconductor switch; and
based on a first value of the detected first resonance current, determine whether an object is placed above the first working coil.

17. The apparatus of claim 16, where the controller is configured to apply, to the first inverter, a first voltage corresponding to each of the plurality of pulses and a second voltage corresponding to each of time intervals between the plurality of pulses, the second voltage being less than the first voltage.

18. The apparatus of claim 16, where the controller is configured to, based on a predetermined period, alternately apply the plurality of pulses to the first semiconductor switch and the second semiconductor switch.

19. The apparatus of claim 16, where the controller is configured to:
apply a second portion of the plurality of pulses to the second semiconductor switch;
detect a second resonance current generated in the second working coil in response to the second portion of the plurality of pulses applied to the second semiconductor switch; and
based on a second value of the detected second resonance current, determine whether at least a portion the object is placed above the second working coil.

20. The apparatus of claim 16, where the controller is configured to:
based on the first value being less than a reference value, determine that at least a portion of the object is placed above the first working coil.

* * * * *